United States Patent [19]

Tennen

[11] Patent Number: 5,782,203
[45] Date of Patent: Jul. 21, 1998

[54] ANIMAL LITTER SCOOP RETAINING SYSTEM

[76] Inventor: Leslie I. Tennen, 849 N. Third Ave., Phoenix, Ariz. 85003

[21] Appl. No.: 692,708

[22] Filed: Aug. 6, 1996

[51] Int. Cl.⁶ .................................................. A01K 1/035
[52] U.S. Cl. .................................................. 119/166
[58] Field of Search .................................. 119/166, 165, 119/472, 496

[56] References Cited

U.S. PATENT DOCUMENTS

| | | | |
|---|---|---|---|
| 4,437,430 | 3/1984 | DeBardeleben | 119/165 X |
| 4,517,920 | 5/1985 | Yamamoto | 119/166 |
| 4,771,731 | 9/1988 | Derx et al. | 119/166 |
| 4,926,794 | 5/1990 | Yamamoto | 119/165 |
| 5,320,064 | 6/1994 | Selstad | 119/472 |
| 5,499,610 | 3/1996 | Bruner et al. | 119/166 |
| 5,515,812 | 5/1996 | Faust | 119/166 |

*Primary Examiner*—Michael J. Carone
*Assistant Examiner*—Yvonne R. Abbott
*Attorney, Agent, or Firm*—Martin L. Stoneman

[57] ABSTRACT

An animal litter scoop retaining system is described for creating a litter box area, protected from the digging and other motions of a cat or similar animal, for storing animal litter scoops "stabbed" into the litter. A preferred bar member extends diagonally across a corner of, and within, a typical rectangular litter box and is detachably attached to the litter box, thus separating a small corner litter area for "stabbing" the scoop into the litter and a large area for normal litter use. The bar member blocks off the small corner litter area at least at the height from the litter box bottom of about half the overall height of the litter box. And the bar member, for efficiency, is preferably raised off the bottom and not extending substantially above a height of about half the overall height of the litter box above the bottom.

20 Claims, 3 Drawing Sheets

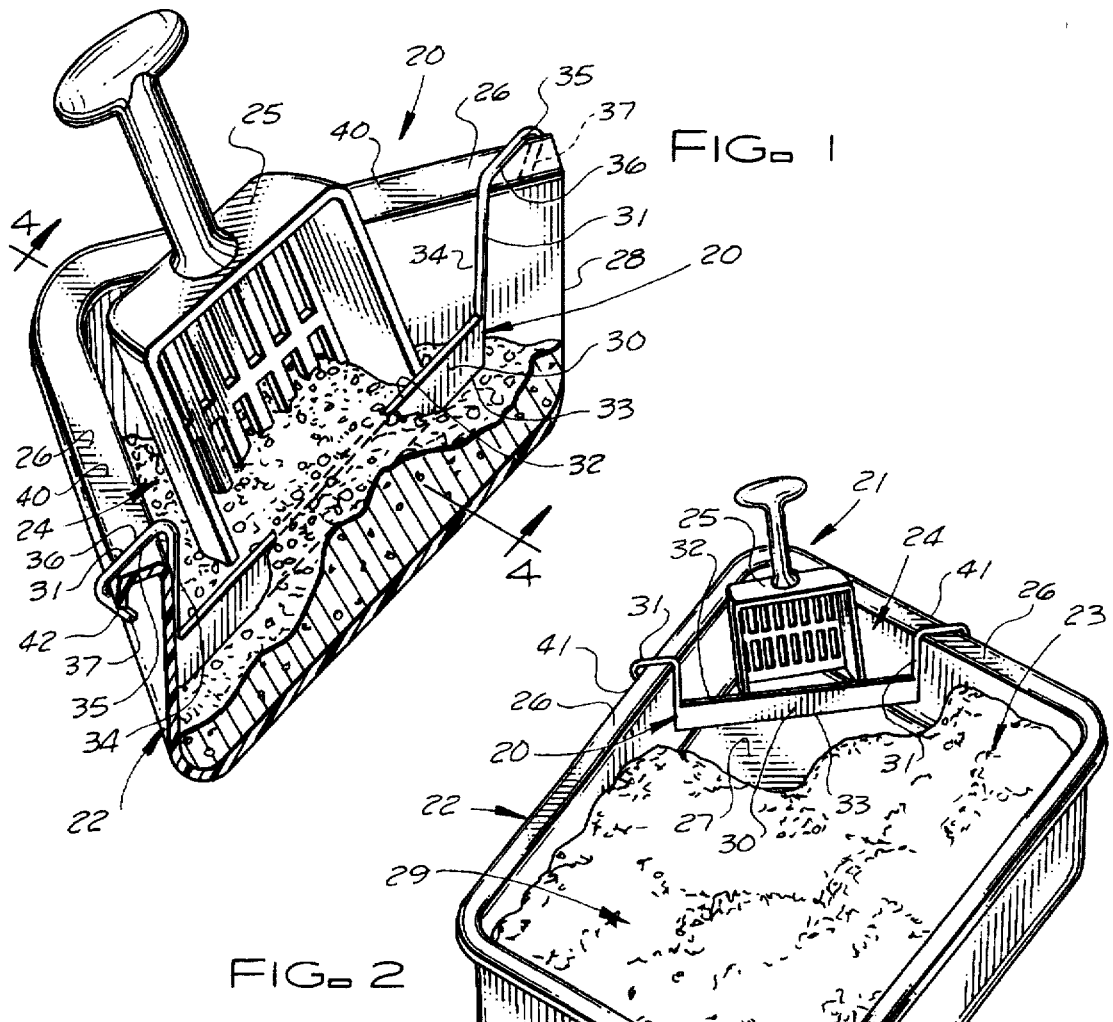
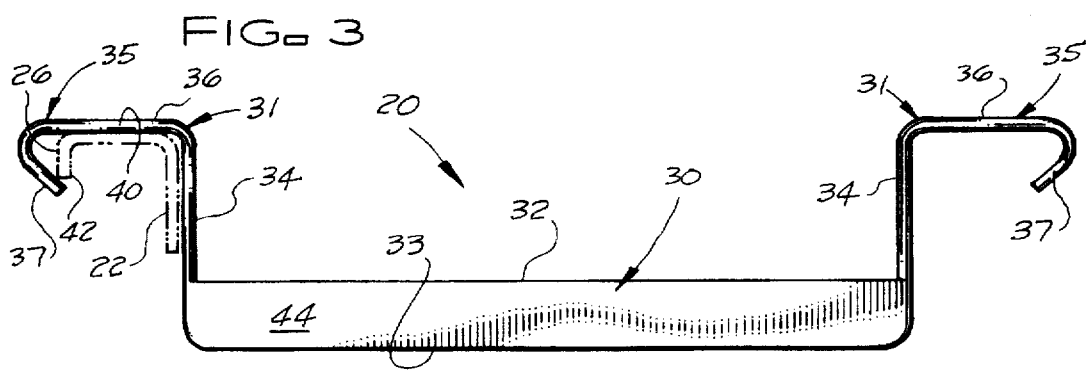

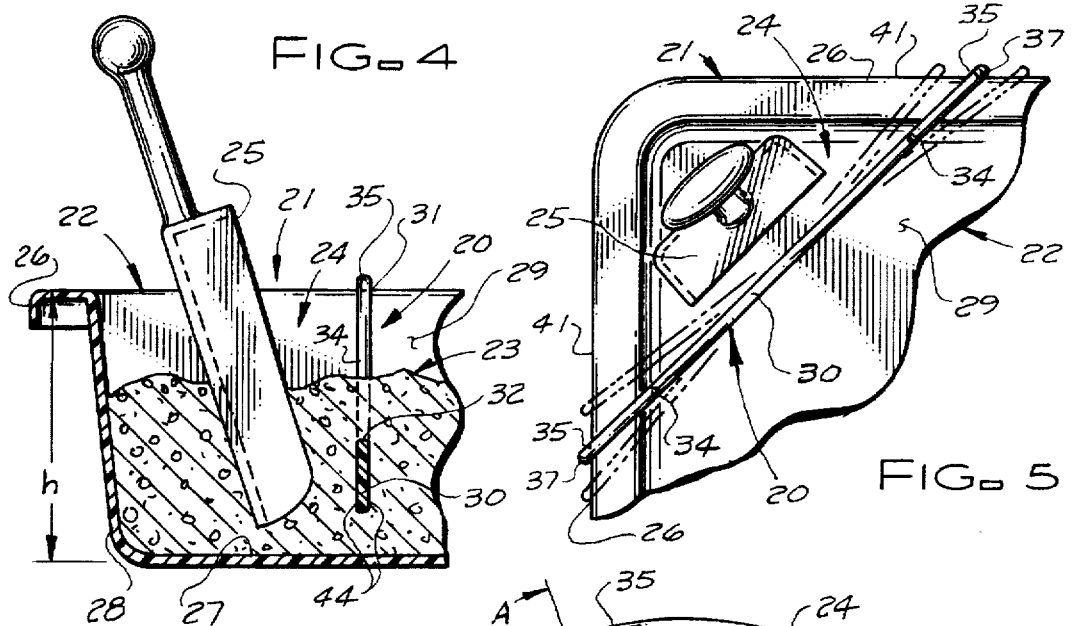
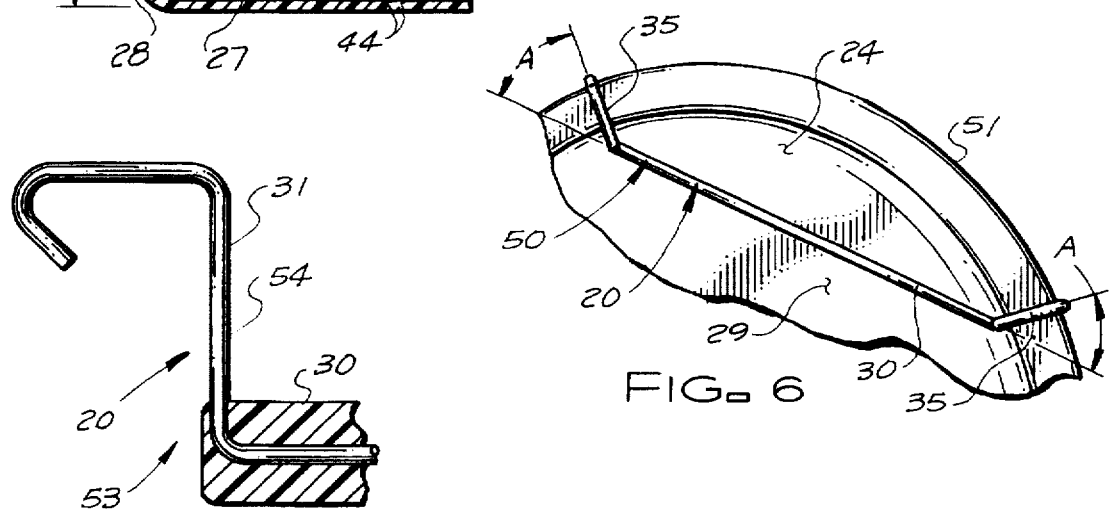
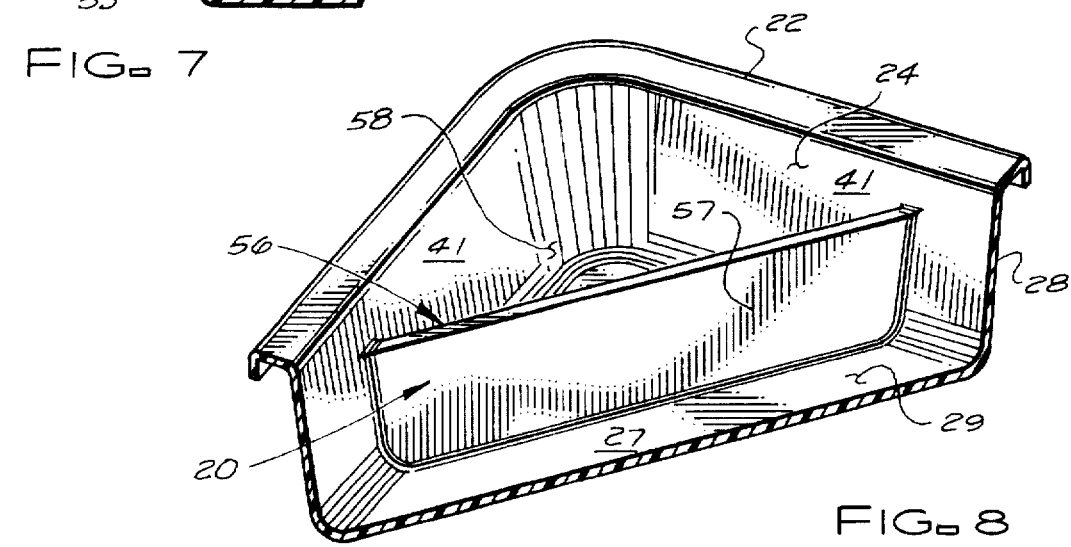

ANIMAL LITTER SCOOP RETAINING SYSTEM

BACKGROUND OF THE INVENTION

1. Field of the Invention

This invention relates to providing an animal litter scoop retaining system. More particularly, this invention concerns systems for creating a litter box area, protected from the digging and other motions of a cat or similar animal, for storing animal litter scoops "stabbed" into the litter.

2. Description of the Prior Art

Typically, the owner of a cat or other litter-type animal, between uses of a litter scoop for litter cleaning, "stores" such scoop by "stabbing" the scoop into the litter, leaving the handle exposed. Often, the scoop is left in a corner of the typically-rectangular litter box in an effort to keep it out of the way of the digging and other motions in a litter box of such animals. But frequently such cat or other litter animal, accidentally or purposefully, moves, toys with, or dirties the handle of such scoop, creating a problem for the owner when next wishing to clean the litter using the scoop. There is a need for a system for protecting such a scoop between uses and retaining it in its proper place and condition, and without interfering with the owner's habit of "stabbing" the scoop into the litter in a corner of the litter box, nor obstructing the animal's use.

OBJECTS OF THE INVENTION

A primary object of the present invention is to fulfill the above-mentioned need by the provision of a scoop retaining system which overcomes the above problems. A further primary object of the present invention is to provide such a system which is efficient, inexpensive, and handy. Other objects of this invention will become apparent with reference to the following invention descriptions.

SUMMARY OF THE INVENTION

According to a preferred embodiment of the present invention, this invention provides an animal litter scoop retaining system, for use with a litter box having a bottom and upstanding wall portions of at least about height h, such bottom and all such wall portions defining an exterior and an interior for litter containment, such system comprising: obstruction means for creating a partial obstruction in a such interior for litter containment; attachment means for attaching such obstruction means to a such litter box for location between a first such wall portion and a second such wall portion, in such manner as to define a such interior for litter containment into a small first space and a large second space; such obstruction means being structured and arranged to comprise, when attached to a such litter box, a longitudinal substantially-obstructive portion between a such first space and a such second space at a height of at least about one-half of h above a such bottom.

Moreover, this invention provides such an animal litter scoop retaining system wherein such attachment means comprises means for detachably supporting such obstruction means; and, further, wherein such attachment means comprises first support means for detachably supporting such obstruction means on a top of a such upstanding wall portion; and, further, wherein such first support means comprises hook means constructed and arranged for capturing a such top of a such upstanding wall portion; and, further, wherein such hook means is situate at an angle of about 45 degrees from the length direction of such longitudinal substantially-obstructive portion; and, further, wherein such hook means comprises a wire bar member.

Additionally, this invention provides such an animal litter scoop retaining system wherein such attachment means comprises second support means for detachably supporting such obstruction means on an interior surface of a such upstanding wall portion. And it provides such an animal litter scoop retaining system wherein: such second support means comprises a support portion comprising a vertical slot for supporting such obstruction means; and such obstruction means comprises slot-engaging means for engaging such vertical slot; and, further, wherein such attachment means further comprises adhesive means for adhesively attaching such second support means to a such interior surface of a such upstanding wall portion. It further provides such an animal litter scoop retaining system wherein such longitudinal substantially-obstructive portion comprises a flat member constructed and arranged, when attached to a such litter box, to lie substantially in a plane perpendicular to a such bottom; and, further, wherein such flat member is constructed and arranged, when attached to a such litter box, for elevation above a such bottom. And it further provides such an animal litter scoop retaining system wherein such longitudinal substantially obstructive portion comprises a member constructed and arranged, when attached to a such litter box, for elevation above a such bottom; and, further, wherein such longitudinal substantially obstructive portion comprises a member constructed and arranged, when attached to a such litter box, for not extending substantially above a height of about one-half of h above such bottom.

Even further, in accordance with a preferred embodiment thereof, this invention provides an animal litter scoop retaining system comprising: a litter box having a bottom and upstanding wall portions of at least about height h, such bottom and all such wall portions defining an exterior and an interior for litter containment; obstruction means for creating a partial obstruction in a such interior for litter containment; attachment means for attaching such obstruction means to such litter box for location between a first such wall portion and a second such wall portion, in such manner as to define such interior for litter containment into a small first space and a large second space; such obstruction means being structured and arranged to comprise, when attached to such litter box, a substantially obstructive portion between such first space and such second space at a height of at least about one-half of h above such bottom. And moreover, it provides such an animal litter scoop retaining system wherein: such bottom is substantially rectangular; such small first space consists essentially of a corner area of such litter box; and said longitudinal substantially-obstructive portion comprises a bar member constructed and arranged, when attached to a said litter box, for elevation above a said bottom and not extending substantially above a height of about one-half of h above said bottom. And it provides such an animal litter scoop retaining system wherein such attachment means comprises means for detachably supporting such obstruction means.

Even additionally, in accordance with a preferred embodiment thereof, this invention provides an animal litter scoop retaining system comprising the steps of: providing a litter box having a substantially-rectangular bottom and upstanding wall portions of at least about height h, such bottom and all such wall portions defining an exterior and an interior for litter containment; attaching a partially obstructive device to such litter box for location between a first such wall portion and a second such wall portion, in such manner as to define such interior for litter containment into a small first space, defining a corner area of such litter box, and a large second space, such obstructive device comprising a substantially obstructive portion between such first space and such second space at a height of at least about one-half of h above such bottom. And it provides such an animal litter scoop retaining system further comprising the steps of: filling such litter box with animal litter until such litter box is more than about half full of such animal litter; and locating a litter scoop partially within such animal litter within such small first space. And it further provides such an animal litter scoop retaining system wherein such obstructive device comprises a slot-engaging end portion and such attaching comprises the steps of: adhesively affixing a support member comprising a vertical slot to a such interior surface of a such upstanding wall portion; and engaging such end portion vertically into such vertical slot in such manner as to attach such obstructive device to such support member.

BRIEF DESCRIPTION OF THE DRAWINGS

FIG. 1 is an enlarged perspective view showing a scoop retainer in use in a corner of a cat litter box, according to the present invention.

FIG. 2 is a perspective view of the cat litter box and scoop retainer of FIG. 1, with the litter removed in the retainer area to more clearly illustrate the present invention.

FIG. 3 is a front elevation view of a preferred embodiment of a scoop retainer.

FIG. 4 is a cross-sectional elevation view through the section 4—4 of FIG. 1.

FIG. 5 is a plan view of a scoop retainer in a cat litter box.

FIG. 6 is a plan view of a first alternate embodiment of a scoop retainer.

FIG. 7 is a partial front elevation view of a second alternate embodiment of a scoop retainer.

FIG. 8 is a perspective view of a third alternate embodiment of a scoop retainer.

DETAILED DESCRIPTION OF A PREFERRED EMBODIMENT

AND THE BEST MODE OF PRACTICE

Figure 9:
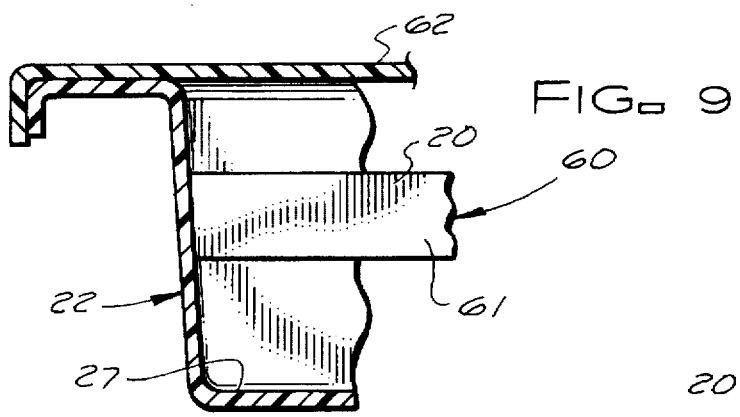
FIG. 9 is a cross-sectional elevation view of a litter box with lid and a fourth alternate embodiment of a scoop retainer.

Illustrated in FIGS. 1–5 is a preferred embodiment of a scoop retainer 20 shown installed diagonally across and within a corner 21 of a typical litter box 22 which is partially filled with litter 23. The corner space 24, which is the area of the corner 21 bound by the scoop retainer 20, forms a containment area for the storage of a typical litter scoop 25. A more general overall view of a typical litter box 22 utilizing a scoop retainer 20, is illustrated in FIG. 2, with the litter 23 shown removed from the corner 21 containing the scoop retainer 20. The illustrated litter box 22 typically represents the style and proportions of those litter boxes commonly marketed for use by cat owners and their pet household cats. This typical litter box 22 would be rectangular (or square), molded of a plastic material, and with a flanged lip 26 extending around its top outer perimeter. An average depth from the flanged lip 26, at its top 40, to the interior bottom 27 is approximately three inches. This is thus the typical height h (see FIG. 4) of the litter box walls 28. It is noted that animal litter scoop retaining system of the present invention is for use with a litter box having a bottom 27 and upstanding wall portions 28 of at least about height h, such bottom and all such wall portions defining an exterior and an interior for litter containment (as shown in the figures). The depth of the litter 23 that the cat owner places within the litter box 22 naturally varies due to individual preference, but generally is approximately 2 inches, which is at a higher level than the litter 23 (of FIG. 1), which is shown at a lower level for clarity of the illustration.

The litter scoop 25 shown typifies an average scoop designed and marketed for the purpose of sifting through the litter 23 of a litter box and removing the waste left in the litter 23 by the cat (or other animal). The obstruction means of this invention for creating a partial obstruction in a such litter box interior for litter containment is embodied by the scoop retainer 20, used in a litter box 22 for the purpose of eliminating the problems of storing a litter scoop 25 between its uses. The litter scoop 25 is merely (as is typical) "stabbed" into the litter 23, to hold it upright, but always in the corner space 24 behind the scoop retainer 20. The cat's pawing and digging in the litter 23 or attempts to play with or move the litter scoop 25, would normally unseat and disturb the placement of the litter scoop 25. But use of the scoop retainer 20 (especially the bar 30 thereof) protects the scoop retainer 20 from the common disturbances caused by the cat. It has been found that a cat in a litter box fitted with a scoop retainer according to the present invention will consistently avoid disturbing a litter scoop "stabbed" behind such retainer.

According to a preferred embodiment of this invention, the longitudinal bar 30 of the scoop retainer 20, is flat and in a vertical plane, i.e., longitudinal bar 30 comprises a flat member constructed and arranged, when attached to a litter box 22, to lie substantially in a plane perpendicular to bottom 27 (as shown). Bar 30 is held horizontally (in a horizontally-situated litter box 22, but such use of "horizontal" herein means parallel to the plane of interior bottom 27 of a typical litter box 22) by a positioner 31 at each of its ends, thus creating the diagonal barrier of the corner space 24 by the bar 30. Preferably, the top edge 32 of bar 30 is positioned and held about 1½ inches below the flanged lip 26 at the top of the litter box 22 (i.e., at about one-half of height h above the bottom 27 of litter box 22, thus preferably permitting litter to flow over bar 30), and the vertical height of the bar 30 is preferably about ¾ inch. Thus, with the scoop retainer 20 installed in a described typical litter box, the bottom edge 33 of the bar 30 is approximately ¾ inch above the interior bottom 27 of the litter box 22. Thus, the bar 30 is preferably constructed and arranged, when attached to a litter box 22, for elevation above bottom 27; and it has been found that such elevation, permitting litter to flow under bar 30 as well as over bar 30, improves the operation and efficiency of this invention. It is also preferred, to attain such efficiency, that such longitudinal substantially-obstructive portion comprise a bar member 30 constructed and arranged, when attached to a litter box 22, for not extending substantially above a height of about one-half of h above such bottom 27.

These typical preferred dimensions are further illustrated in FIG. 4. With a typical fill depth of litter 23, the top edge 32 of bar 30 is submerged in the litter 23; although, with the variances in fill depth, and the digging and pawing by the cat, the bar 30 may be either submerged in the litter 23 or exposed. It has been found that, regardless of such variations in the litter 23, the scoop retainer 20 consistently prevents the cat from disturbing the "stabbed" stored litter scoop 25 within the litter within the corner space 24.

Each of the two positioners 31 (one at each end of the bar 30) incorporates a vertical leg 34, connected to and rising vertically from the bar 30, and terminating in a hook 35 which engages the flanged lip 26 of the litter box 22. Each hook 35 includes a horizontal portion 36 extending outwardly and at right angle (or perpendicular) to the vertical leg 34, and then terminating in a hook end 37. The horizontal portion 36 at each end of the scoop retainer 20 rests atop the top surface 40 of connecting sides 41 of the litter box 22, both of which sides present a portion of a wall 28 for defining (with scoop retainer 20) corner space 24, a small first space. A large space 29 is defined by the remainder of the interior of the litter box 22. The hook end 37 at the outer end of each horizontal portion 36 of each positioner 31 hooks beneath the outer bottom edge 42 of the appropriate flanged lip 26. Thus the attachment means of the present invention, for attaching such obstruction means to a such litter box for location between a first such wall portion and a second such wall portion, in such manner as to define a such interior for litter containment into a small first space and a large second space, is in this embodiment embodied by hook 35 and vertical leg 34. And it is noted that, in this described embodiment, it is preferred that the attachment means of this invention comprises means for detachably supporting the obstruction means of this invention; and, more particularly, it comprises support means for detachably supporting the obstruction means on a top 32 of a such upstanding wall portion 28.

As the scoop retainer 20 is positioned diagonally across one corner 21 of the litter box 22, and attached to two connecting sides 41 joining at that corner 21, it is restricted from moving inwardly toward corner 21 by the vertical leg 34 contact against the connecting sides 41, and outwardly by the outer bottom edge 42 restraining the hook end 37. This self-locating positioning establishes the corner space 24 for the litter scoop 25 storage. The bar 30, which is the portion of the scoop retainer 20 which retains the litter scoop 25 and deters the cat, is positioned downward from the top surface 40 of the litter box 22 by the vertical leg 34 of the positioner 31. And the bar 30 is prevented from being raised upward by the hook end 37 of the positioner 31 engaging the outer bottom edge 42 of the flanged lip 26. Thus, the hook means (embodied by hook 35) of this invention is constructed and arranged for capturing a top of a such upstanding wall portion.

A front elevation view of the scoop retainer 20 is shown in FIG. 3. The preferred embodiment may be manufactured in well-known ways of a durable plastic or nylon. The bar 30 is preferably about 6 inches long and substantially rectangular in cross-section. The front and rear vertical surfaces 44 of bar 30 are preferably flat with preferably about 1/8 of an inch or less in thickness between front and rear vertical surfaces 44. As mentioned, bar 30 is preferably about 3/4 of an inch in height. Thus, according the present invention, the obstruction means of this invention is structured and arranged to comprise, when attached to a litter box, a longitudinal substantially-obstructive portion (embodied in this embodiment by the specified-height portion of bar 30) between a small first space and a large second space at a height of at least about one-half of h above the bottom of the litter box.

A positioner 31 rises vertically from each end of the bar 30 with a vertical leg 34 terminating smoothly and outwardly into the horizontal portion 36 of hook 35. At the outward end of each hook 35 is a hook end 37 which is pointed inward and downward at an approximate angle of 45 degrees from the horizontal portion 36. The hook end 37 extends to a location approximately under the outer bottom edge 42 of the litter box 22 (which is indicated by dotted lines in FIG. 3). The hook 35 of the positioner 31 extends outwardly about 1½ inches from the vertical leg 34. Such dimensions allow the hook 35 to engage a typical-width flanged lip 26 of a litter box 22 when installed diagonally. Each positioner 31 is preferably round in cross-section and about 1/8 inch in diameter. When installing the discussed scoop retainer 20, variances in the dimensional size of a flanged lip 26 of a typical litter box 22 are usually compensated by the flexibility of the plastic material of a typical litter box 22.

FIG. 4 shows a vertical cross-section view through the corner of the litter box 22 at section 4—4 of FIG. 1. The scoop retainer 20 is positioned diagonally across the corner 21 of the litter box 22 forming a corner space 24 for storing the litter scoop 25 when it is not being used for removal of unwanted waste from the litter 23. The depth of the litter 23 within the litter box 22 is typically sufficient to hold the litter scoop 25 in place (providing the cat does not dig up or disturb the litter scoop 25). The bar 30 of the scoop retainer 20 consistently prevents the cat from disturbing the litter 23 within the corner space 24. The bar 30 of the scoop retainer 20 is positioned within the interior of the litter box 22 with the vertical leg 34 of the positioner 31. The hook 35 of the positioner 31 is engaged to the flanged lip 26 of the litter box 22.

In FIG. 5 is shown a plan (or top) view of a corner 21 of a litter box 22. Installed diagonally across the corner 21 and attached to the flanged lip 26 of two adjacent connecting sides 41 is the scoop retainer 20. The bar 30 of the scoop retainer 20 establishes a corner space 24 for storing a litter scoop 25. Each end of the scoop retainer 20 incorporates a hook 35 to engage the appropriate connecting sides 41 with the vertical leg 34 and the hook end 37 generally eliminating side to side movement. This engagement at the flanged lip 26 maintains the scoop retainer 20 in a generally diagonal position with extreme movement (beyond that shown by dotted lines in FIG. 5) prohibited in the manner heretofore discussed.

FIG. 6 illustrates a first alternate preferred embodiment 50 of the scoop retainer 20. Shown in a plan view is a typical portion of a round or oblong litter box 51. With the absence of an actual corner, a corner space 24 is established for storing a litter scoop with a simple modification of the scoop retainer 20. The hook 35 at each end of the first alternate embodiment 50 is situate (as shown) at an angle of about 45 degrees from the length direction of the longitudinal substantially-obstructive portion (embodied by bar 30), as represented by angle A. It is noted that this modification may also be used with a square or rectangular litter box.

A second alternate preferred embodiment 53 of the scoop retainer 20 is shown in FIG. 7, showing a modification of the materials with which the scoop retainer 20 is constructed. A partial cross-sectional elevation view of a typical end of the scoop retainer 20 is illustrated. A round metal rod or wire bar member 54 (in the embodiment 53 of scoop retainer 20) is firmly attached (in well-known ways, preferably in the position shown) to the bar 30 (of FIG. 7), preferably made of a plastic material. The metal used in wire bar member 54 could be of carbon steel plated or coated, to resist corrosion, or of non-corrosive stainless steel or aluminum. An advantage of metal being used as the positioner 31 is that it may be very efficiently bent to fit non-typical litter box flanges or bent in an angle as described in FIG. 6.

A third alternate preferred embodiment 56 of the scoop retainer 20 is shown in a perspective view in FIG. 8. The embodiment 56 of scoop retainer 20 is an integral feature of the litter box 22 and is in the form of a flat vertical panel 57 spanning diagonally between the interiors of the two connecting sides 41, as shown. It serves as a divider to form a compartment 58 (which is also the corner space 24), in which to store a litter scoop 25 in the described manner.

Additionally, a modification similar to the third alternate preferred embodiment 56 is shown in FIG. 9, illustrating the fourth alternate preferred embodiment 60. In a cross-section elevation view (FIG. 6) is illustrated a litter box 22 with an integrally molded embodiment 60 of scoop retainer 20. In lieu of a full-length panel 57 as described in FIG. 8, is a flat vertical bar 61, located up off the interior bottom 27 of the litter box 22. This flat vertical bar 61 is equivalent in size, location, and function to the bar 30 of the preferred embodiment. The advantage over the third alternate embodiment 56 of FIG. 8 is that a separate fully enclosed compartment (as in compartment 58 in FIG. 8) is not provided, and cleaning ease and litter maintenance are somewhat more efficient than in the embodiment of FIG. 8. An advantage of a integrally molded scoop retainer 20 is that a fitted cover 62 (see FIG. 9) may be used to seal the top of the litter box 22. With the scoop retainer 20 of the first preferred embodiment (of FIG. 1), a fitted cover 62 would not be able to seal against the flanged lip 26 in the area where the hooks 35 are located unless hooks 35 were made sufficiently thin.

Figure 10:
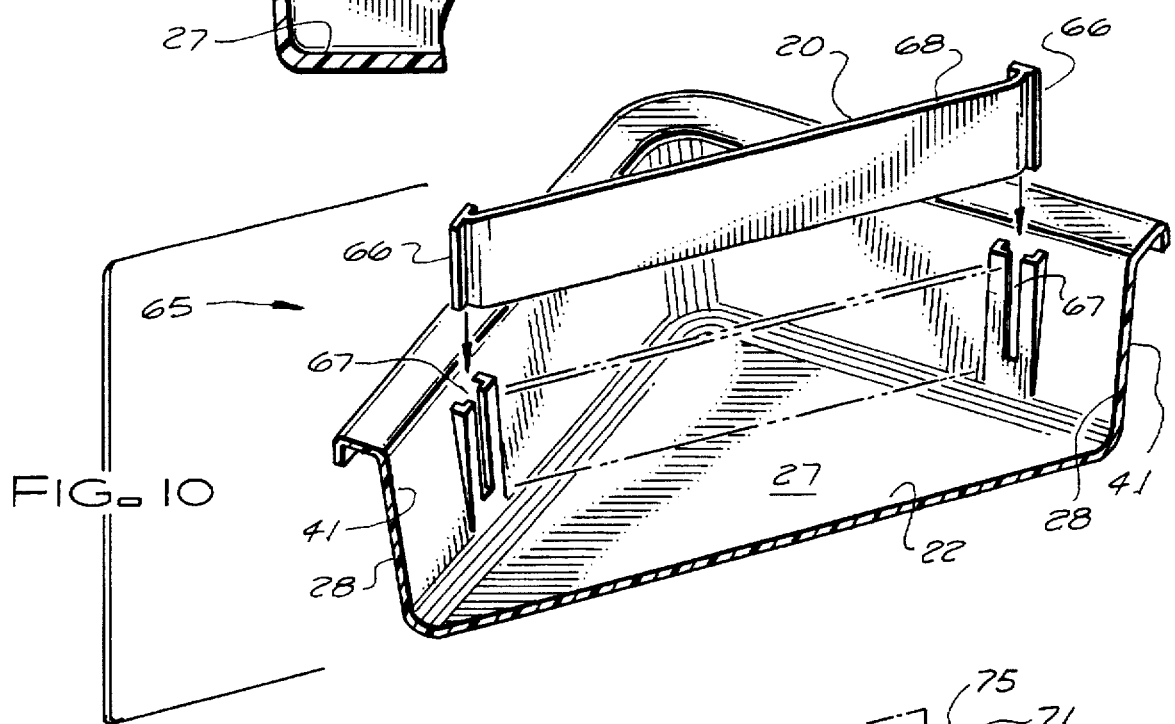
FIG. 10 is a perspective exploded view of a fifth alternate embodiment of a scoop retainer.

A perspective view of a fifth alternate embodiment 65 is shown in FIG. 10. A flanged socket 67 is integrally molded to the interiors of each of the two connecting sides 41 of the litter box 22, as shown. Upon set-up of the litter box 22, a scoop retainer bar 68 with T-shaped flanged ends 66 is inserted downward (see arrows) into the flanged sockets 67. The scoop retainer bar 68 then operates in the same manner as the bar 30 of the first preferred embodiment in location and function. It is noted that the T-shaped flanged ends 66 of the embodiment of FIG. 10 must be at about a 45 degree angle inward toward the corner in order to fit into the flange sockets 67, as shown. An advantage of the fifth alternate embodiment 65 is that litter boxes 22 may be stacked together whereas an integrally molded panel or bar (as in the embodiments of FIGS. 8 and 9) prohibits stacking and complicates shipping, storing, and marketing of the product.

Figure 11:
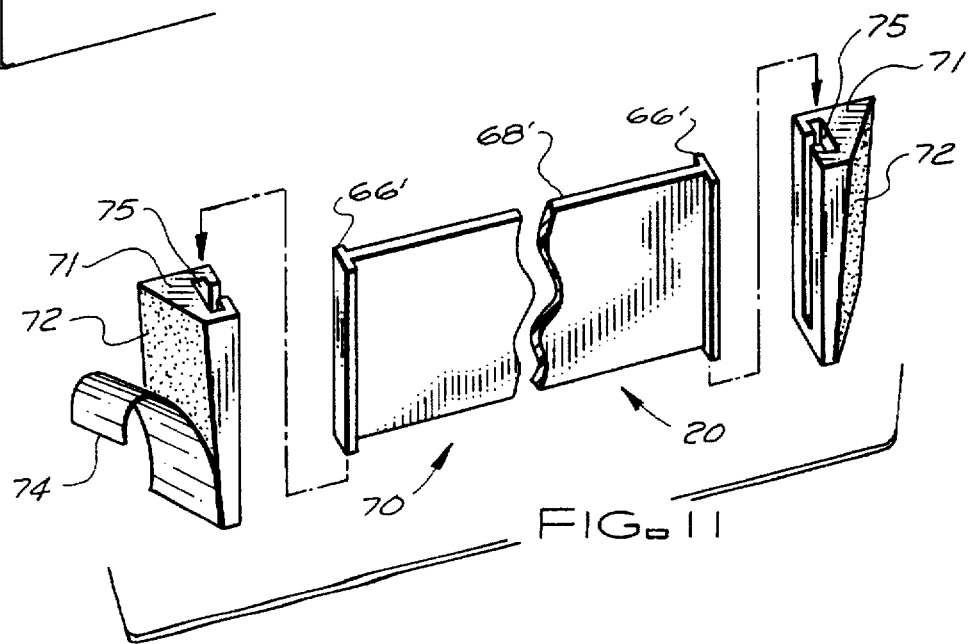
FIG. 11 is a perspective exploded view of a sixth alternate embodiment of a scoop retainer.

An exploded perspective view of a sixth alternate embodiment 70 of the scoop retainer 20 is shown in FIG. 11. Embodiment 70 is for retrofit installation into a conventional litter box 22. This retrofit preferably incorporates three items. A scoop retainer bar 68' with T-shaped flanged ends 66' is used in conjunction with flanged-socket members 71. The flanged-socket members 71 incorporate an adhesive coated surface 72 as an adhesive means for adhesively attaching such support means (as member 71) to interior surfaces of adjacent litter box walls (for example, see the interiors of walls 28 of the connecting sides 41 of the litter box 22 of FIG. 1 or FIG. 10). The scoop retainer bar 68'and flanged-socket members 71 are positioned within the litter box to form a diagonal corner space 24 (as allocated, e.g., in FIGS. 2 and 5). A peel-off protective film 74 would, in well-known ways, protect each adhesive coated surface 72 prior to installation. Thus, according to this invention, there is provided a support means 71 for detachably supporting such obstruction means 20 on an interior surface of an upstanding wall portion 28 of a litter box 22; and, more particularly, the support means 71 comprises a support portion comprising a vertical slot 75 for supporting such obstruction means 20; and the obstruction means 20 comprises slot-engaging means (embodied by T-shaped flanged ends 66') for engaging such vertical slot 75.

Also, thus, the animal litter scoop retaining system of this invention (as shown herein) preferably comprises the steps of: providing a litter box 22 having a substantially-rectangular bottom 27 and upstanding wall portions 28 of at least about height h, such bottom and all such wall portions defining an exterior and an interior for litter containment; attaching a partially obstructive device 30 to such litter box 22 for location between a first such wall portion and a second such wall portion, in such manner as to define such interior for litter containment into a small first space 24, defining a corner area of such litter box, and a large second space 29, such obstructive device comprising a substantially obstructive portion between such first space and such second space at a height of at least about one-half of h above such bottom; filling such litter box with animal litter until such litter box is more than about half full of such animal litter; and locating a litter scoop partially within such animal litter within such small first space; and, further wherein such obstructive device 30 comprises a slot-engaging end portion 66' and such attaching comprises the steps of adhesively affixing a support member comprising a vertical slot 75 to a such interior surface of a such upstanding wall portion, and engaging such end portion vertically into such vertical slot in such manner as to attach such obstructive device to such support member.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. An animal litter scoop retaining system, for use with a litter box having a bottom and upstanding wall portions of at least about height h, said bottom and all said wall portions defining an exterior and an interior for litter containment, said system comprising:
   a. obstruction means for creating a partial obstruction in a said interior for litter containment;
   b. attachment means for attaching said obstruction means to a said litter box for location between a first said wall portion and a second said wall portion, in such manner as to define a said interior for litter containment into a small first space and a large second space horizontally adjacent to said small first space;
   c. said obstruction means having a longitudinal axis and being structured and arranged to comprise, when attached to a said litter box, a longitudinal substantially-obstructive bar portion situate between a said first space and a said second space at a height of at least about one-half of h above a said bottom and along said longitudinal axis.

2. An animal litter scoop retaining system according to claim 1 wherein said attachment means comprises means for detachably supporting said obstruction means.

3. An animal litter scoop retaining system according to claim 2 wherein said attachment means comprises first support means for detachably supporting said obstruction means on a top of a said upstanding wall portion.

4. An animal litter scoop retaining system according to claim 3 wherein said first support means comprises hook means constructed and arranged for capturing a said top of a said upstanding wall portion.

5. An animal litter scoop retaining system according to claim 4 wherein said hook means is situate at an angle of about 45 degrees from the length direction of said longitudinal substantially-obstructive bar portion in such manner as to improve full engagement of said hook means with said upstanding wall portions.

6. An animal litter scoop retaining system according to claim 4 wherein said hook means comprises a wire bar member.

7. An animal litter scoop retaining system according to claim 2 wherein said attachment means comprises second support means for detachably supporting said obstruction means on an interior surface of a said upstanding wall portion.

8. An animal litter scoop retaining system according to claim 1 wherein said longitudinal substantially-obstructive bar portion comprises a member constructed and arranged, when attached to a said litter box, for elevation above a said bottom.

9. An animal litter scoop retaining system according to claim 1 wherein said longitudinal substantially-obstructive bar portion comprises a member constructed and arranged, when attached to a said litter box, for not extending substantially above a height of about one-half of h above said bottom.

10. An animal litter scoop retaining system for use with a litter box having a bottom and upstanding wall portions of at least about height h, said bottom and all said wall portions defining an exterior and an interior for litter containment, said system comprising:
   a. obstruction means for creating a partial obstruction in a said interior for litter containment;
   b. attachment means for attaching said obstruction means to a said litter box for location between a first said wall portion and a second said wall portion, in such manner as to define a said interior for litter containment into a small first space and a large second space;
   c. said obstruction means being structured and arranged to comprise, when attached to a said litter box, a longitudinal substantially-obstructive portion between a said first space and a said second space at a height of at least about one-half of h above a said bottom
   d. wherein said attachment means comprises means for detachably supporting said obstruction means;
   e. wherein said attachment means comprises second support means for detachably supporting said obstruction means on an interior surface of a said upstanding wall portion; and
   f. wherein said second support means comprises a support portion comprising a vertical slot for supporting said obstruction means; and
   g. wherein said obstruction means comprises slot-engaging means for engaging said vertical slot.

11. An animal litter scoop retaining system for use with a litter box having a bottom and upstanding wall portions of at least about height h, said bottom and all said wall portions defining an exterior and an interior for litter containment, said system comprising:
   a. obstruction means for creating a partial obstruction in a said interior for litter containment;
   b. attachment means for attaching said obstruction means to a said litter box for location between a first said wall portion and a second said wall portion, in such manner as to define a said interior for litter containment into a small first space and a large second space;
   c. said obstruction means being structured and arranged to comprise, when attached to a said litter box, a longitudinal substantially-obstructive portion between a said first space and a said second space at a height of at least about one-half of h above a said bottom;
   d. wherein said attachment means comprises means for detachably supporting said obstruction means;
   e. wherein said attachment means comprises second support means for detachably supporting said obstruction means on an interior surface of a said upstanding wall portion; and
   f. wherein said attachment means further comprises adhesive means for adhesively attaching said second support means to a said interior surface of a said upstanding wall portion.

12. An animal litter scoop retaining system according to claim 11 wherein:
   a. said second support means comprises a support portion comprising a vertical slot for supporting said obstruction means; and
   b. said obstruction means comprises slot-engaging means for engaging said vertical slot.

13. An animal litter scoop retaining system for use with a litter box having a bottom and upstanding wall portions of at least about height h, said bottom and all said wall portions defining an exterior and an interior for litter containment, said system comprising:
   a. obstruction means for creating a partial obstruction in a said interior for litter containment;
   b. attachment means for attaching said obstruction means to a said litter box for location between a first said wall portion and a second said wall portion, in such manner as to define a said interior for litter containment into a small first space and a large second space;
   c. said obstruction means being structured and arranged to comprise, when attached to a said litter box, a longitudinal substantially-obstructive portion between a said first space and a said second space at a height of at least about one-half of h above a said bottom; and
   d. wherein said longitudinal substantially-obstructive portion comprises a flat member constructed and arranged, when attached to a said litter box, to lie substantially in a plane perpendicular to a said bottom.

14. An animal litter scoop retaining system according to claim 11 wherein said flat member is constructed and arranged, when attached to a said litter box, for elevation above a said bottom.

15. An animal litter scoop retaining system comprising:
   a. a litter box having a bottom and upstanding wall portions of at least about height h, said bottom and all said wall portions defining an exterior and an interior for litter containment;
   b. obstruction means for creating a partial obstruction in a said interior for litter containment;
   c. attachment means for attaching said obstruction means to said litter box for location between a first said wall portion and a second said wall portion, in such manner as to define said interior for litter containment into a small first space and a large second space horizontally adjacent to said small first space;

d. said obstruction means having a longitudinal axis and being structured and arranged to comprise, when attached to a said litter box, a longitudinal substantially-obstructive bar portion situate between a said first space and a said second space at a height of at least about one-half of h above a said bottom and along said longitudinal axis.

16. An animal litter scoop retaining system according to claim 15 wherein said attachment means comprises means for detachably porting said obstruction means.

17. An animal litter scoop retaining system comprising:

a. a litter box having a bottom and upstanding wall portions of at least about height h, said bottom and all said wall portions defining an exterior and an interior for litter containment;

b. obstruction means for creating a partial obstruction in a said interior for litter containment;

c. attachment means for attaching said obstruction means to said litter box for location between a first said wall portion and a second said wall portion, in such manner as to define said interior for litter containment into a small first space and a large second space;

d. said obstruction means being structured and arranged to comprise, when attached to said litter box, a substantially obstructive portion between said first space and said second space at a height of at least about one-half of h above said bottom;

e. wherein said bottom is substantially rectangular, said small first space consists essentially of a corner area of said litter box, and said longitudinal substantially-obstructive portion comprises a bar member constructed and arranged, when attached to a said litter box, for elevation above a said bottom and not extending substantially above a height of about one-half of h above said bottom.

18. An animal litter scoop retaining system comprising the steps of:

a. providing a litter box having a substantially-rectangular bottom and upstanding wall portions of at least about height h, said bottom and all said wall portions defining an exterior and an interior for litter containment; and b. attaching a partially obstructive device to said litter box for location between a first said wall portion and a second said wall portion, in such manner as to define said interior for litter containment into a small first space, defining a corner area of said litter box, and a large second space.

i. said obstructive device comprising a substantially obstructive portion between said first space and said second space at a height of at least about one-half of h above said bottom.

19. An animal litter scoop retaining system according to claim 18 further comprising the steps of:

a. filling said litter box with animal litter until said litter box is more than about half full of said animal litter; and b. locating a litter scoop partially within said animal litter within said small first space.

20. An animal litter scoop retaining system according to claim 18 wherein said obstructive device comprises a slot-engaging end portion and said attaching comprises the steps of:

a. adhesively affixing a support member comprising a vertical slot to a said interior surface of a said upstanding wall portion; and b. engaging said end portion vertically into said vertical slot in such manner as to attach said obstructive device to said support member.

* * * * *